(12) United States Patent
Ushakov

(10) Patent No.: US 9,282,179 B2
(45) Date of Patent: Mar. 8, 2016

(54) ACCESSORY FOR MOBILE ELECTRONIC DEVICE

(71) Applicant: Alexey Leonidovich Ushakov, Moscow (RU)

(72) Inventor: Alexey Leonidovich Ushakov, Moscow (RU)

(*) Notice: Subject to any disclaimer, the term of this patent is extended or adjusted under 35 U.S.C. 154(b) by 0 days.

(21) Appl. No.: 14/530,228

(22) Filed: Oct. 31, 2014

(65) Prior Publication Data
US 2015/0358450 A1   Dec. 10, 2015

(30) Foreign Application Priority Data

Jun. 4, 2014  (RU) ................................ 2014122774

(51) Int. Cl.
| | |
|---|---|
| *H04M 1/00* | (2006.01) |
| *H04M 1/725* | (2006.01) |
| *H04B 1/3827* | (2015.01) |
| *H04M 1/02* | (2006.01) |
| *H04M 1/05* | (2006.01) |

(52) U.S. Cl.
CPC ............. *H04M 1/7253* (2013.01); *H04B 1/385* (2013.01); *H04M 1/0281* (2013.01); *H04M 1/0283* (2013.01); *H04M 1/05* (2013.01); *H04B 2001/3872* (2013.01)

(58) Field of Classification Search
None
See application file for complete search history.

(56) References Cited

U.S. PATENT DOCUMENTS

| | | | | | |
|---|---|---|---|---|---|
| 4,319,350 | A * | 3/1982 | Fatton | ................... | G04G 9/0094 368/22 |
| 5,477,508 | A * | 12/1995 | Will | ....................... | G04G 21/00 368/189 |
| 6,418,394 | B1 * | 7/2002 | Puolakanaho | ....... | A61B 5/0002 600/523 |
| 6,552,860 | B1 * | 4/2003 | Alden | ....................... | E06B 9/24 359/666 |
| 8,073,180 | B2 * | 12/2011 | Bruckhoff | .............. | H04R 1/105 381/374 |
| 2001/0004337 | A1 * | 6/2001 | Paratte | ................... | G04C 10/00 368/203 |
| 2006/0114751 | A1 * | 6/2006 | Ferri | ................... | G04F 37/0075 368/281 |
| 2006/0272134 | A1 * | 12/2006 | Turuani | ..................... | A44C 5/24 24/71 J |
| 2007/0200716 | A1 * | 8/2007 | Haase | ................... | G08B 15/004 340/574 |
| 2009/0052284 | A1 * | 2/2009 | Behling | ............... | G04G 9/0076 368/22 |
| 2014/0221854 | A1 * | 8/2014 | Wai | .................... | A61B 5/02444 600/508 |

\* cited by examiner

*Primary Examiner* — Dominic Rego

(57) ABSTRACT

Control means of a wearable electronic communication device for control purpose and use thereof are claimed. The wearable electronic communication device comprises a flexible loop being at least partly flattened and comprising non-twistable rigid members; an electronic unit; and push buttons disposed on the rigid members at such a distance from each other so as to avoid possibility of pushing two push buttons simultaneously with one finger, wherein the push surface of each push button does not project beyond the surface of the rigid member bearing the push button, and a control signal is generated only when two push buttons are pushed simultaneously.

16 Claims, 18 Drawing Sheets

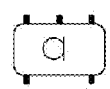
Fig. 13
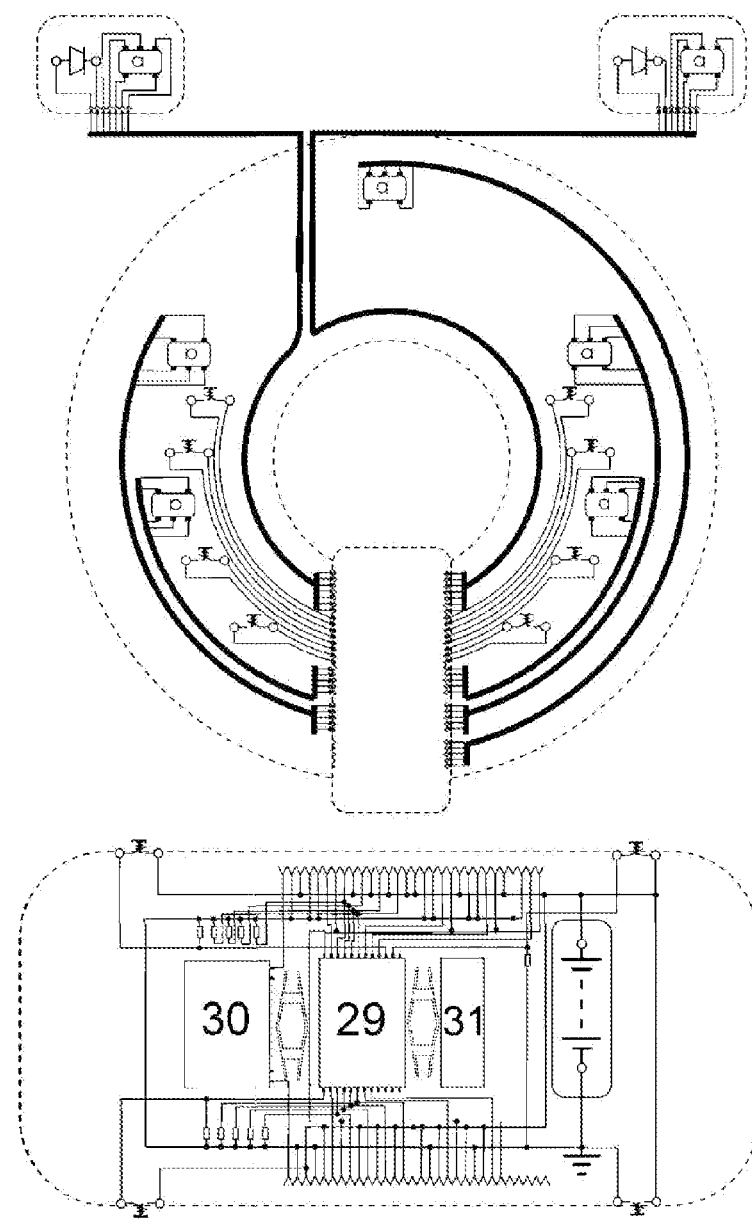
Fig. 14
Fig. 15

ACCESSORY FOR MOBILE ELECTRONIC DEVICE

FIELD OF THE INVENTION

The invention relates to wearable electronic communication devices, in particular, to an accessory for a mobile electronic device.

DESCRIPTION OF THE RELATED ART

Nowadays, electronic communication devices tend to be more and more compact, thus enabling them to be worn on the user's body when the devices are both in operation state and in stand-by state. These devices include smart phones and various accessories related to them provided in the form of watches, headsets and necksets comprising earphones, including those in the form of a necklace, spectacle frames with embedded displays, or even systems comprising such devices wired or wirelessly connected to each other and/or to a smart phone. Some primary and auxiliary functions of the main wearable device (like a computer or a smart phone) tend to be transferred to peripheral equipment located at different parts of the user's body, thus enabling to bring the wearable device closer to the natural human interface (like ears, eyes, and fingers).

Nowadays, the main dimensions (length and width) of smart phones are stable and depend on human anatomical and physiological characteristics. However thickness of smart phones continues to decrease, thus reducing mechanical rigidity and power supply capacity; moreover, control of the device becomes uncomfortable and non-informative, that is why some of the main functions of a wearable device including control functions are transferred to additional wearable devices and accessories, thus enabling to press keys and buttons of an accessory in order to control the main wearable device without pulling it out of a pocket or a bag.

In order to make interaction with a wearable device comfortable, its control means have to be as ergonomical as possible, i.e. they have to correspond to human anatomical characteristics, and they should not stand out against the user's body when the user is wearing the device. Wearable devices of little thickness have to have a rather big surface area adjacent to the user's body, in order to provide enough space to accommodate their equipment base; that requires the devices to be flexible in those portions which are adjacent to the human body, for replicating, without bristling, all bends occurring in complex kinematics chains of the human body in motion.

One way of making these devices comfortable for users and barely visible for people around the users, is to wear the devices under clothes. But in this case it may be difficult to control them by keys and buttons without observing them. In addition, erroneous actions of the keys and buttons of an accessory having long wires must be avoided. These erroneous actions may occur due to movement of user's trunk and limbs, accidental pressing by a belt of a bag hanging over a shoulder, or by a seat belt in a car. Further, it is desirable to avoid twisting the device located on the user's body, which twisting may impede pressing a necessary button disappeared from the area of tactile sensing.

This invention is aimed at providing a button control interface for an electronic communication device wearable on the user's body, having control members which are easily accessible for the user, while being protected against accidental pressing, and not hindering the user's movements, and which are barely visible for people around the users.

What is known is a modular interface belt (U.S. Pat. No. 7,618,260 B2, published on Nov. 17, 2009) comprising a belt bearing electrically linked connectors for connecting to various interface modules, wherein data exchange with external devices is also provided. The belt may be mechanically closed like a loop for wearing on the user's body. This device advantageously prevents twisting while wearing thereof. However if a button-based control member is placed in one of the connectors, the buttons could not be protected against accidental pressing.

What is known is a multi-button control means for an accessory of a mobile communication device (application US 2011/0263303 published on Oct. 17, 2011) comprising a set of buttons, a controller detecting pressing one of the buttons and generating a control signal for a processor selecting a function according to the control signal. It does not provide any way of affixing the accessory on the user's body (like a way of wearing the accessory being in the form of a loop), button protection against accidental pressing is not provided, and generating a control signal is performed upon a single press of a button, which considerably limits quantity of available control signals and functionality of the set of buttons.

What is known is a device in the form of a button equipped with a timer for starting an application (U.S. Pat. No. 6,727,830 B2, published on Apr. 27, 2004), in which device the time of pressing the button is measured and double pressing is detected, thus causing a processor to generate a control signal according to the time of pressing the button or the number of pushes of the button. However, while using this device in a wearable mobile device configured to be placed on the user's body, there is a risk of generating an erroneous signal upon occidental pressing one button by a foreign object or by the user.

What is known is an electronic device equipped with configurable buttons (U.S. Pat. No. 8,717,199 B2, published on May 6, 2014), comprising input members, sensors for detecting objects, and control mechanisms. This device protects the button interface against occidental pressing, but it does not provide possibility of pressing buttons through clothes; moreover, the layout of the buttons assuring tactile choice of necessary buttons by the user is not disclosed.

What is known is a wireless accessory for mobile device Sony SBH 80, provided in the form of an open loop bearing members for control the device. The accessory has the following limitations:
it tends to twist while wearing by the user, so access to keys may be lost;
two adjacent keys are disposed too close to each other, so they may be pressed simultaneously with one finger, and it may cause activation of a non-intended function;
the keys project beyond the surface of the bearing members, and this may also result in occidental pressing.

Thus, until now, there is no a device intended for continuous wearing, the device optimized for wearing it under clothes when the device is both in operation state and in stand-by state, the device having loose wires of minimal length, which wires adjoin the user's body but do not restrict movements of the user and at the same time enable control the device with no visual contact with it, based on tactile orientation as necessary control keys are found by touch. Providing such a device will increase usability and reliability of affixing on the user's body, and will prevent the device from failure and damage due to catching on neighboring objects.

BRIEF SUMMARY OF THE INVENTION

The invention is aimed at providing a constantly wearable electronic communication device optimized for wearing thereof under clothes when the device is both in operation state and in stand-by state, with loose wires of minimal length, which wires adjoin the body but do not restrict movements of the user, and at the same time enable control the device with no visual contact therewith, based on tactile orientation when necessary control means are found by touch, and non-intended pushing the control means is hampered.

This problem is solved by providing a wearable electronic communication device comprising a flexible loop being at least partly flattened and comprising at least two rigid members connected to each other so as to impede twisting the rigid members relative to each other; at least one electronic unit; control means comprising at least two push buttons electrically connected to the electronic unit and disposed on the rigid members at such a distance from each other so as to avoid possibility of pushing two push buttons simultaneously with one finger, wherein the push surface of each push button does not project beyond the surface of the rigid member bearing the push button, and a control signal for the device is generated when two of the push buttons are pushed simultaneously.

It is advantageous that the electronic unit of the wearable electronic communication device is disposed in one of the rigid members.

It is expedient that at least one of the rigid members further comprises a power source.

It is expedient that the flexible loop of the wearable electronic communication device is open.

It is advantageous that in the wearable electronic communication device while wearing thereof by the user, the push surface of the push button is disposed substantially in parallel with the front surface of the user's chest.

It is expedient that the push surface of the push button occupies a major portion of the rigid member surface.

It is preferable that at least one of the rigid members further comprises a microphone.

It is advantageous that the wearable electronic communication device comprises more than two push buttons and control signals are generated when two push buttons are pushed simultaneously, by selection of various combinations from the at least three push buttons.

It is preferable that the wearable electronic communication device further comprises at least one earphone electrically connected to the electronic unit.

It is advantageous that the control means are configured to generate acoustic signals transmitted to the earphone upon pushing the push buttons.

It is expedient that the push buttons are provided in the form of keys with mechanically driven contacts.

It is advantageous that the push buttons are provided in the form of piezoelectric transducers.

It is preferable that the electronic unit further comprises at least one wireless communication transceiver.

It is advantageous that the electronic unit further comprises an audio recording and/or playing device.

It is expedient that the push buttons are configured to trigger functions selected from the following:
switch the wearable electronic communication device on and off;
answer a mobile communication call;
end a mobile communication call;
pause audio play;
resume audio play;
change audio volume;
select audio track or program;
fast forward/backward;
activate and deactivate voice control.

It is advantageous that the functions triggered by the push buttons are configured by the user.

It is preferable that while wearing the wearable electronic communication device by the user, the push buttons are disposed within an area in the form of an isosceles triangle having the base connecting proximal ends of clavicle and the vertex directed downwards to xiphisternum of the user.

Additionally, the above-stated problem is solved by the use of the wearable electronic communication device for control purpose.

BRIEF DESCRIPTION OF DRAWINGS

The invention is further explained via description of preferred embodiments referring to the following accompanying drawings.

FIGS. 13, 14 and 15 show schematic diagrams of embodiments of the wearable electronic communication device according to the invention.

DETAILED DESCRIPTION OF THE INVENTION

Figure 1:
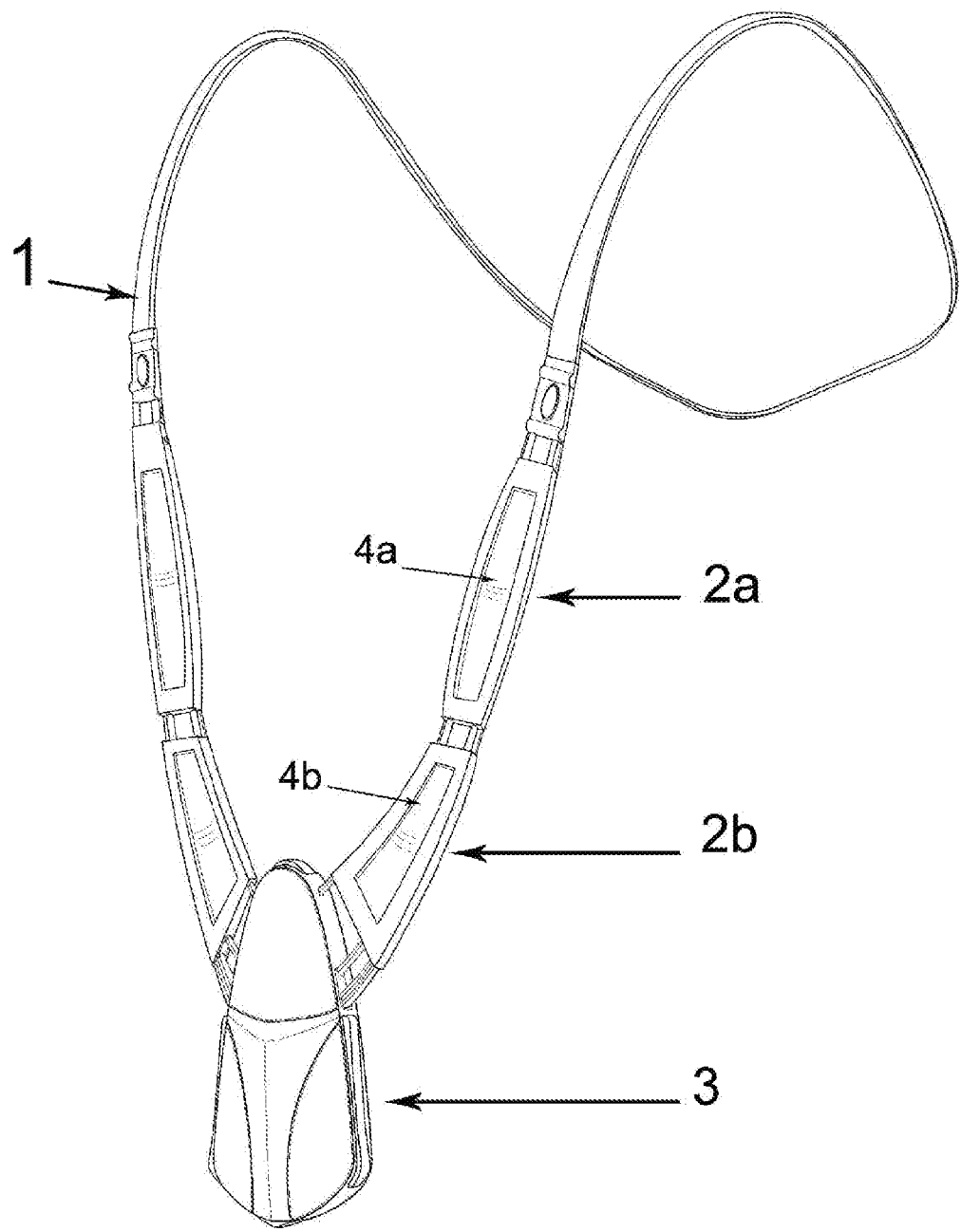
FIG. 1 shows a general view of the wearable electronic communication device according to the invention.

Terms and expressions used herein have the following meanings which may be different from their general meanings.

Accessory (in the form of a headset, or a neckset, or a chestset) is an assembly of mechanically and electrically connected wires, earphones and electrical connectors configured to be worn on the user's body and intended to be connected to a mobile electronic device by wire or wireless means.

Earphone is a device for individual listening to music, speech or any other sound signals configured to be disposed inside the user's outer ear.

Neck loop is a ring-shaped article made of a linear material like a rope, a wire, a strip of fabric or leather, or a chain, secured at the ends thereof, provided in the form of a loop, a ring, a collar, a yoke, a necklace, or a neckerchief, intended to be worn on the user's neck and chest and configured to bear electrical and mechanical devices therein.

Electronic unit is an electrical device configured to be disposed on a neck loop and intended to be connected to another components located on the neck loop and beyond, by wire or wireless means.

Control means is a component of the interface between an accessory and the user provided in the form of mechanical, piezoelectric or any other type of button or key comprising a limited surface, exerting pressure upon which surface causes change in operation of the device connected to the accessory.

Hereinafter explanation of reasons for proposed design of the wearable electronic communication device is given.

Assume that in order to assure wearing a device on the user's body without additional support it is expedient to provide the device in the form of a loop or a half-loop.

This assumption is proved by the form of clothing articles (like panties, belts, pants) and wrist watches which are held on the human body since they are based on the loop form which assures fixation thereof on the body.

Further a few embodiments of a wearable electronic communication device intended for wearing under clothes e.g. in the form of a neck loop or a half-loop are described. The most ergonomic solution is disposing a button interface in the region having form of an isosceles triangle having horizontal base located between proximal ends of clavicle and the vertex directed downwards in the vicinity of xiphisternum in men and somewhat above in women. The reach of hands in this case is based on particularities of the user's clothes, when considering a male dressed in standard European clothes not only in warm but also in cold climate. This layout of the buttons allows managing the electronic device with no pulling it from under the clothes, by pressing keys and buttons which are easily addressable by touch through the standard clothes; the keys and buttons are substantially unmovable and projected to substantially the same spot of the user's body, and they are tactually distinguishable from each other and able to provide a feedback in the form of a tactile or sound response (a click) upon pressing thereof.

FIG. 1 shows an embodiment of the claimed wearable electronic communication device provided in the form of a loop, wherein the wearable device comprises rigid flat shells connected to each other by pairs of cables comprising wires. This type of design is stipulated by the following requirements applicable to constantly wearable accessories suitable for wearing under clothes:
(1) the wearable electronic communication device shall be flexible enough in order to be able to adjust to the user's body shape;
(2) the push buttons shall be located on rigid members;
(3) the wearable device shall be stiff enough in order to avoid flip-over of the buttons located on the rigid members;
(4) the interface buttons shall be disposed in readily accessible places in order to assure comfortable access and control.

In order to provide enough flexibility, the used cables with wires arranged inside the cables have to be flexible. In order to improve reliability of electrical connections, the wires shall have some excess length so as the tension force caused by bent of the cables do not affect considerably the soldering points of the wires. In order to reduce twisting the wearable electronic communication device during wearing thereof, cross-section dimension, optimal length and the number of the cables have to be determined.

Usually in accessories, the shells containing electronic functional devices are mounted directly on the wire, thus often causing the wire twist in turn causing the buttons being out of body field reachable by the user.

The torsional strain concept for a sole wire connecting rigid members may be expressed by an equation characterizing torsional strain of a cylinder, which equation establishes correspondence between the moment T of restoring force and the twist angle $\phi$:

$$T=\phi G J_0 / l \quad (1)$$

wherein G is shear modulus; $J_0$ is geometrical polar moment of inertia; l is the wire length. When considering the cylinder shape, $J_0=\pi r^4/2$, wherein r is the cylinder base radius. The equation (1) shows that decrease in the length l and increase in the cylinder radius r increases the moment of forces impeding the twist. However the increase in the cylinder radius i.e. the wire gage in between the rigid members of the wearable electronic communication device causes great discomfort while wearing thereof, so it is found expedient to shift from a circular wire to a flat wire disposed in parallel with the human body surface while wearing the wearable electronic communication device. In this case a model of an inextensible tape shall be considered instead, since deformation of a tape occurs in the form of bending strain rather than shear strain.

By using a flexible but inextensible tape, additional rigidity in view of rotation of the rigid members relative to the longitudinal axis of the tape may be achieved, still retaining the tape flexibility in the cross-section thereof. As the tape material is inextensible and incompressible, the length of the tape edges is not changed upon twisting the tape to the angle $\phi$ and the tape edges are disposed along spiral geodesic curves on the surface of a cylinder circumscribed by the tape. Thus, if the length L of the tape edges is not changed, then the cylinder height is changed, which height $h_1$ may be determined based on the length of the geodesic curve on the cylinder surface:

$$h_1=(L^2-\phi^2 D^2/4)^{1/2} \quad (2)$$

The equation (2) shows that fixation of the geodesic curve length corresponding to inextensibility of the tape leads to a limitation of possible rotation angle, resulting from the following condition:

$$L^2-\phi^2 D^2/4 \geq 0 \quad (3)$$

Upon button flip-over, $\phi=\pi$, then:

$$L^2-\pi^2 D^2/4 \geq 0 \quad (4)$$

Figure 2:
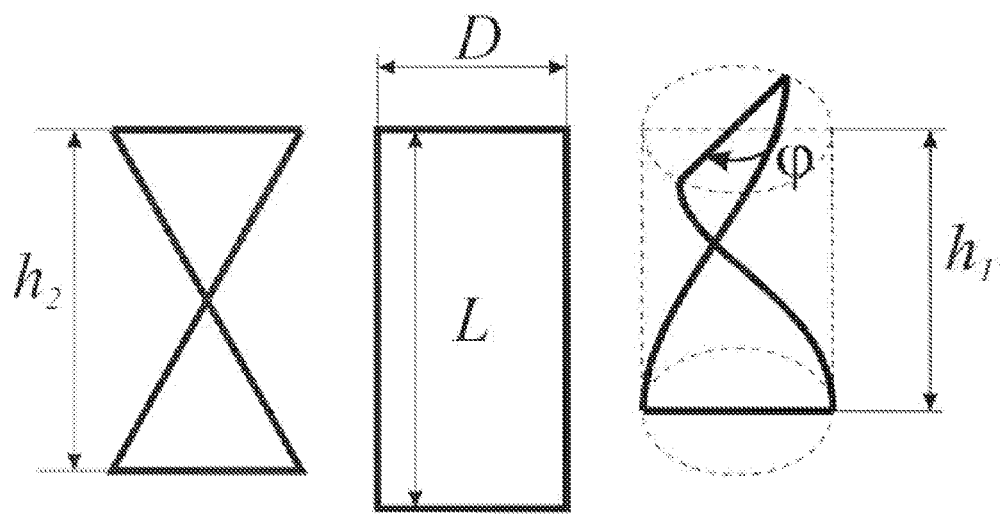
FIG. 2 shows change in the form of flexible inextensible members of the wearable electronic communication device according to the invention, occurring upon rotation thereof.

FIG. 2 shows examples of change in shape of flexible inextensible members upon twisting thereof. In the central part of FIG. 2 a flexible member having the length of L and the diameter of D is shown. A twisted tape is shown in the right part of this figure, and a pair of cables secured to rigid members is shown in the left part, wherein the planes of securing are rotated to 180° relative to each other.

If the length L and the diameter D are selected so that the inequality (4) is false, then button flip-over is impossible due to inextensibility of the tape i.e. in order to prevent button flip-over, it is required that the following condition is met:

$$L \leq \pi D/2 \quad (5)$$

If rigid shells having width of D are connected with two cables having the edge length of L and disposed on the shell sides, then rotation to 180° or $\pi$ radian causes crossing the cables and the height $h_2$ is determined to be $$h_2=(L^2-D^2)^{1/2} \quad (6)$$

Correspondingly, the allowable length of the cables is determined to be $$L \leq D \qquad (7)$$

Therefore, in order to avoid flip-over of the rigid shells, they shall be connected by flexible inextensible members, or a tape, or a pair of cables having a length equal to or less than the shell width.

A wearable electronic communication device (FIG. 1) comprises a flexible loop 1 provided at least partially flattened and comprising at least two rigid members 2a, 2b, wherein the rigid members are connected to each other so as to impede twisting the rigid members relative to each other; at least one electronic unit 3; control means comprising at least two push buttons 4a, 4b electrically connected to the electronic unit and disposed on the rigid members at such a distance from each other so as to avoid possibility of pushing two push buttons simultaneously with one finger, wherein the push surface of each push button does not project beyond the surface of the rigid member bearing the push button, and a control signal is generated when two of the push buttons are pushed simultaneously.

Figure 3:
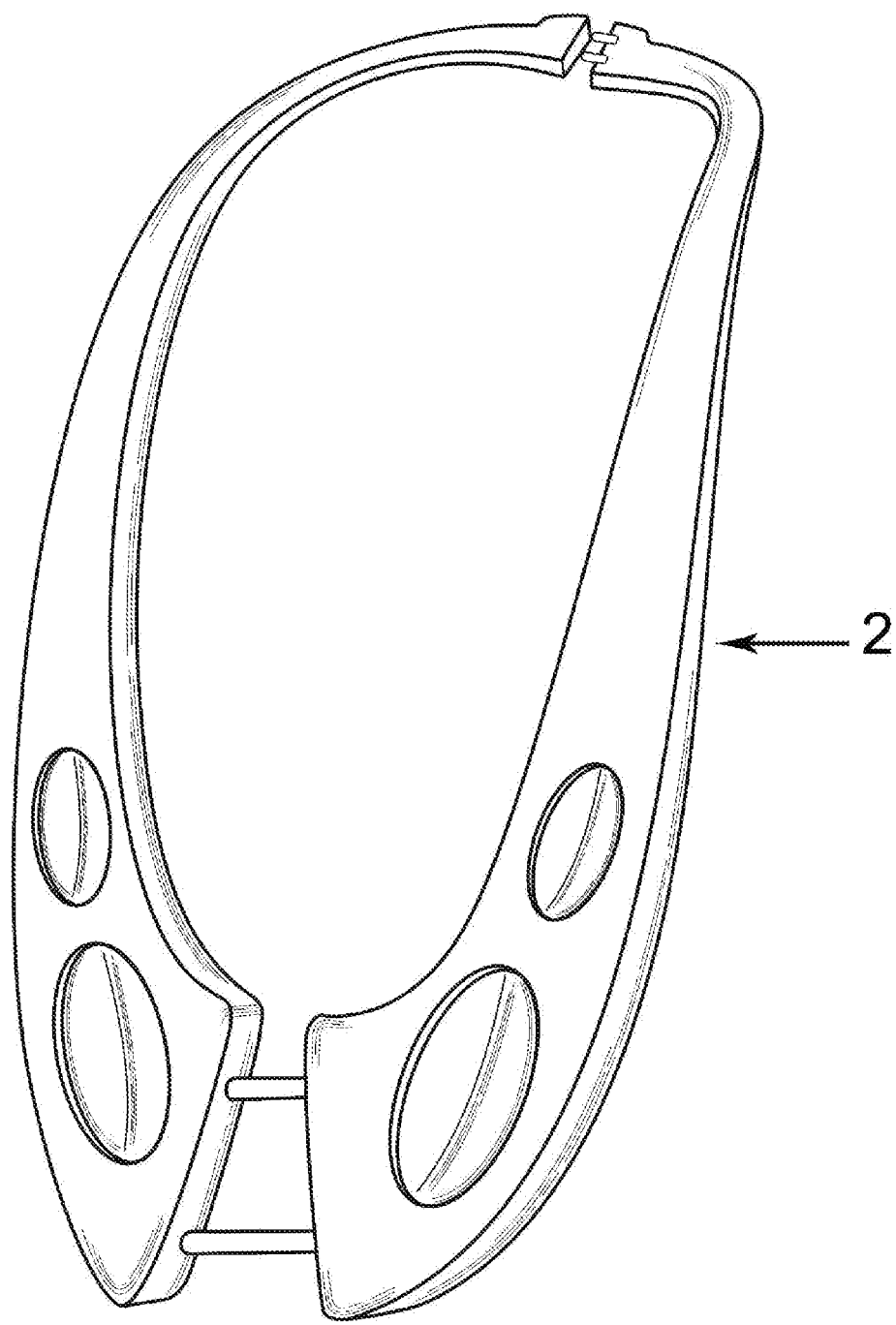
FIG. 3 shows a general view of the wearable electronic communication device according to the invention, having an electronic unit disposed in a rigid member.

In some embodiments, the electronic unit is disposed in one of the rigid members 2 on the flexible loop (FIG. 3).

In preferable embodiments, at least one of the rigid members 2 on the flexible loop additionally comprises a power source.

Figure 4:
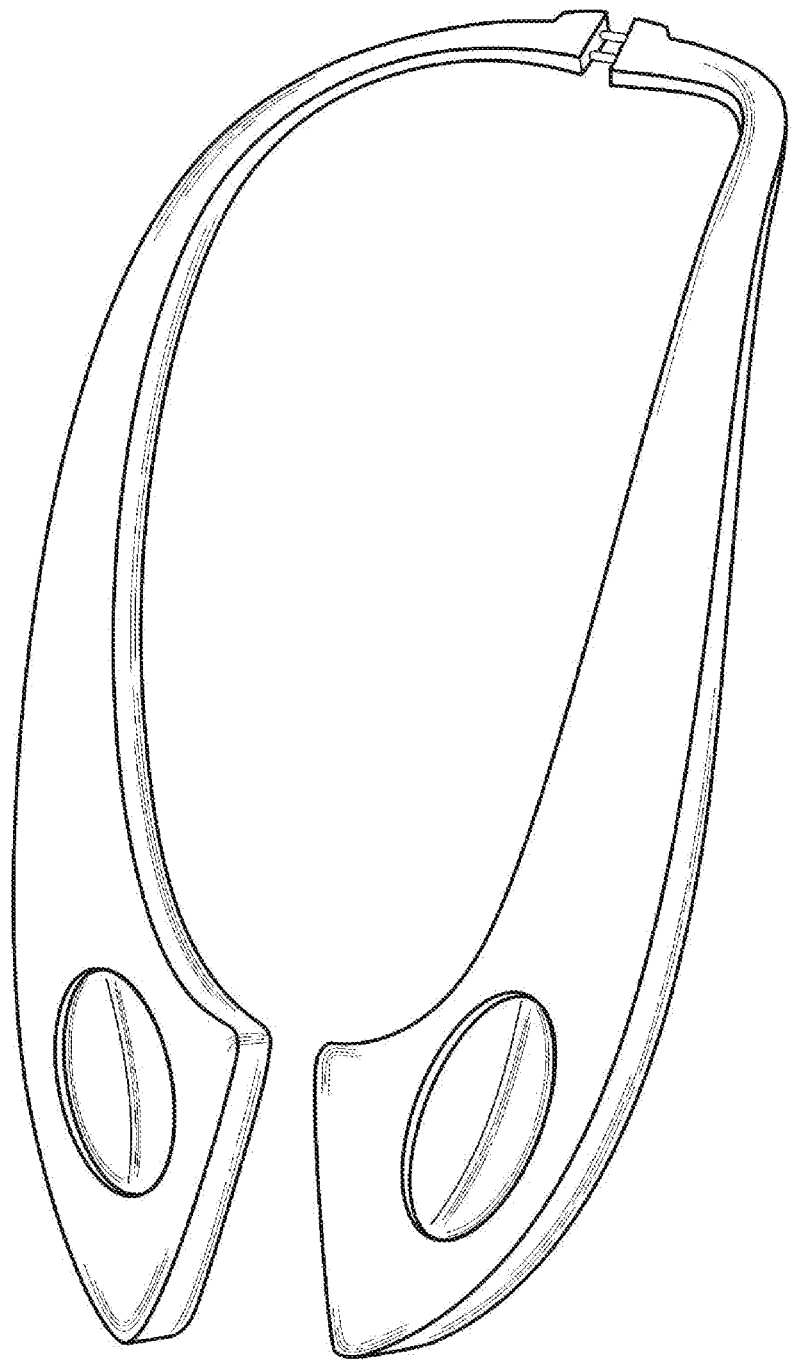
FIG. 4 shows a general view of the wearable electronic communication device according to the invention, in which the loop is open.

In some embodiments of the wearable electronic communication device, the flexible loop is open (FIG. 4).

In some embodiments while wearing the wearable electronic communication device by the user, the push surface of the push button is disposed substantially in parallel with the front surface of the user's chest (FIG. 1, FIG. 3).

In some embodiments, the push surface of the push button 4a occupies a major portion of the surface of the rigid member 2a (FIG. 1).

Figure 5:
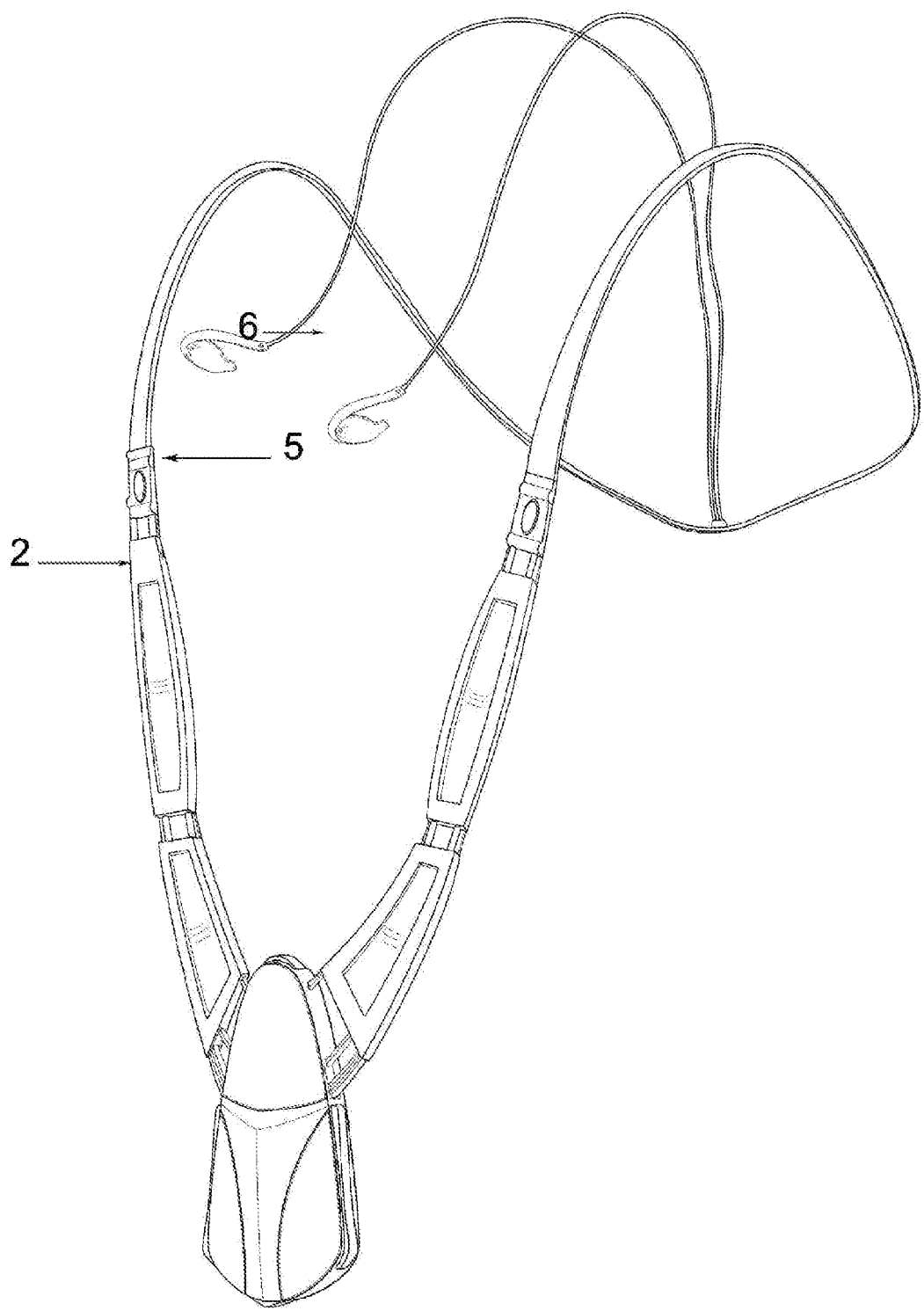
FIG. 5 shows a general view of one embodiment of the wearable electronic communication device according to the invention.

In some embodiments, at least one of the rigid members 2 further comprises a microphone 5 (FIG. 5).

In some embodiments, the wearable electronic communication device comprises more than two push buttons and control signals are generated when two push buttons are pushed simultaneously, by selection of various combinations among the three or more push buttons (FIG. 5).

In preferable embodiments, the wearable electronic communication device further comprises at least one earphone 6 electrically connected to the electronic unit (FIG. 5).

In some embodiments, the control means are configured to generate acoustic signals transmitted to the earphone upon pushing the push buttons.

Figure 6:
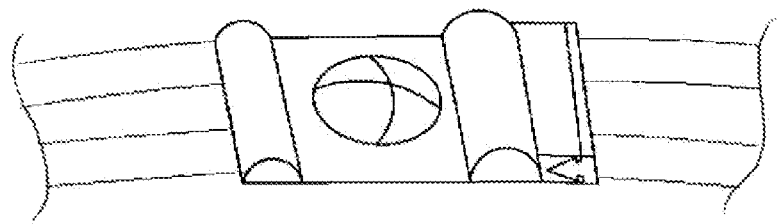
FIGS. 6 and 7 show embodiments of protection of push buttons, according to the invention.
Figure 7:
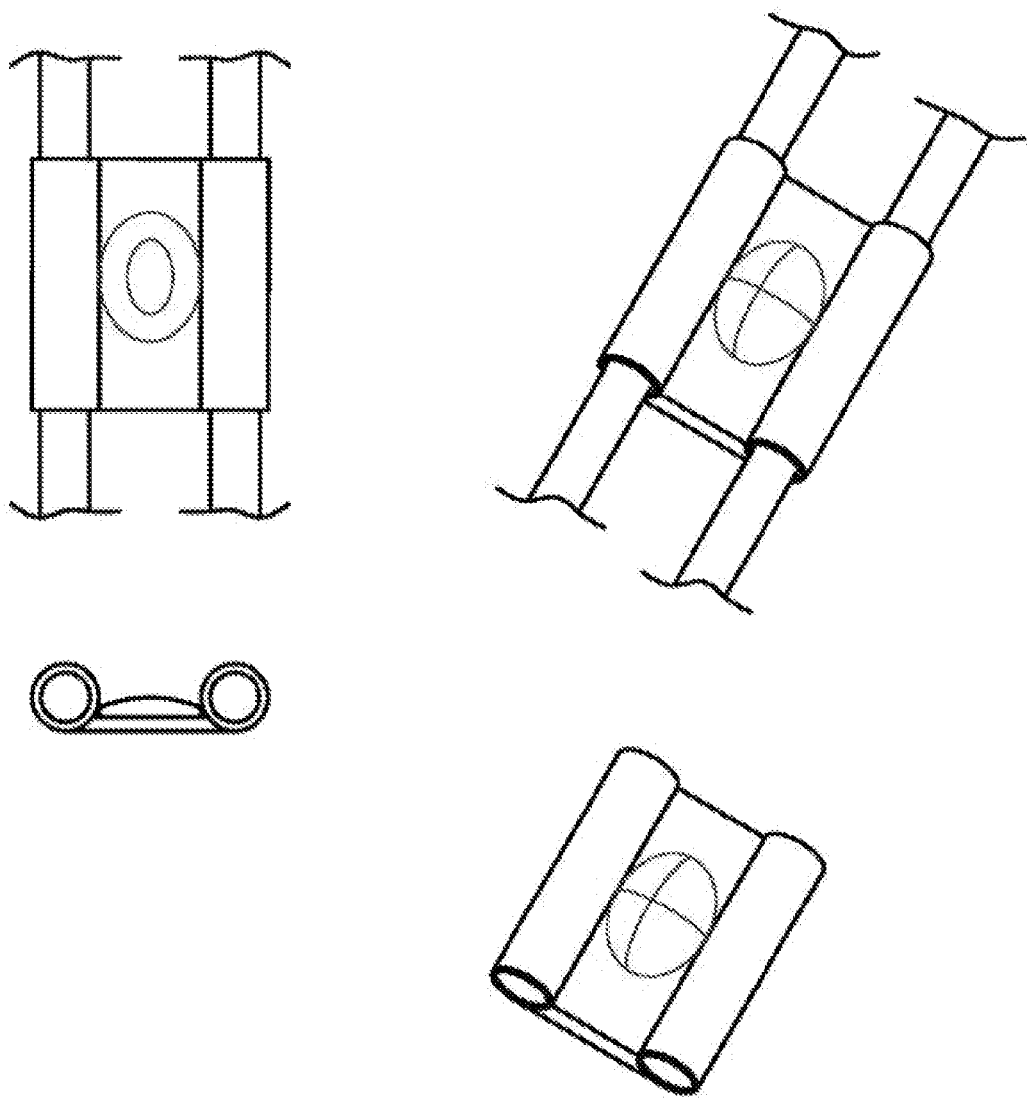

In a few embodiments, the push buttons are provided in the form of keys with mechanically driven contacts. In some embodiments, the push buttons may be equipped with border projections for protection against unintended push (FIG. 6, FIG. 7).

In some embodiments, the push buttons are provided in the form of piezoelectric transducers.

In a few embodiments, the electronic unit may further comprise at least one wireless communication transceiver. Additionally, the electronic unit may further comprise an audio recording and/or playing device.

Figure 8:
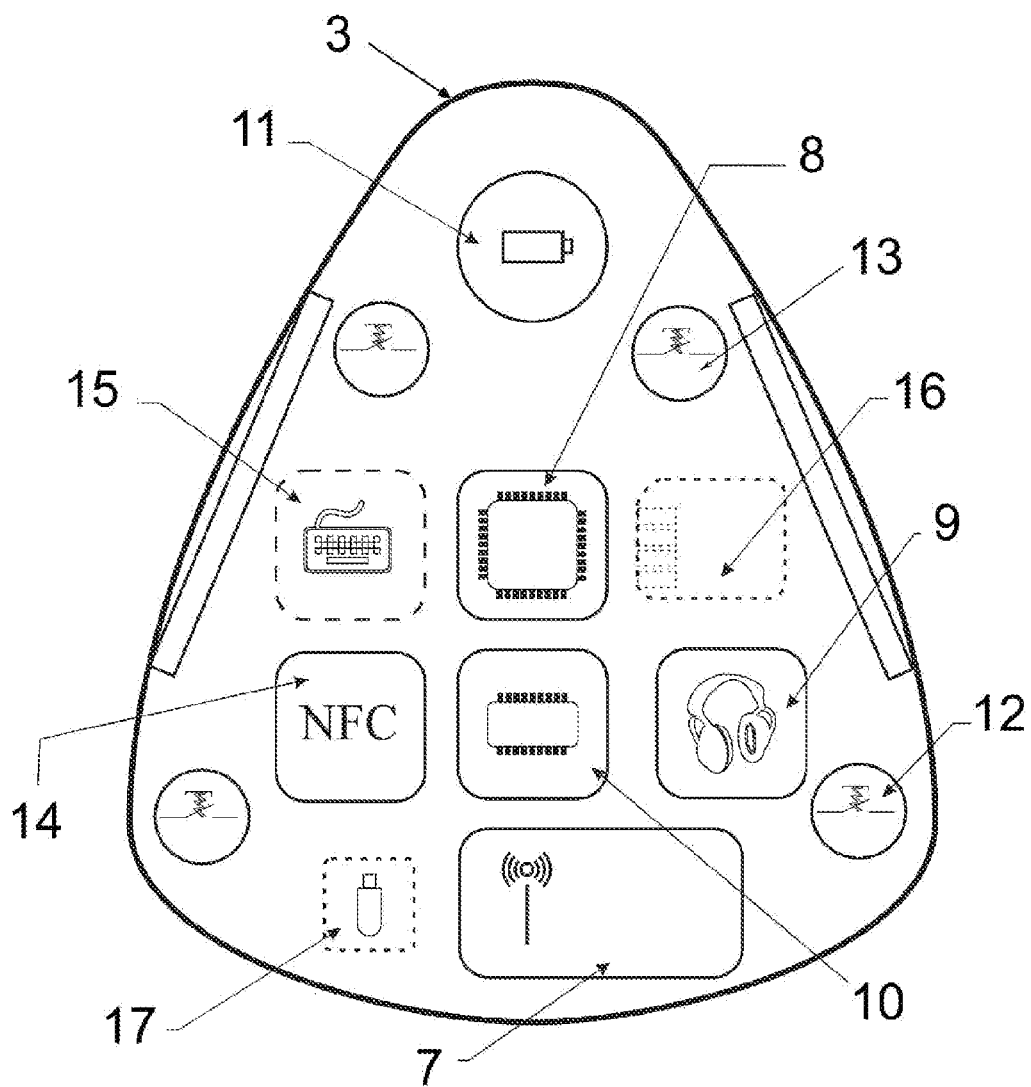
FIG. 8 shows possible arrangement of electronic components of the electronic unit, according to the invention.

The electronic unit may be provided in the form of a medallion. The electronic unit may comprise a transceiver for a signal from a cellular phone, not requiring a radio frequency license like Bluetooth signal. The electronic unit may further comprise a battery, a player, a broadcast radio receiver, a flash memory, an electronic key, a satellite signal receiver e.g. a GPS and/or GLONASS receiver indicating current location by means of voice information provided to the user via the earphones. The electronic components possibly embedded into the electronic unit are shown in FIG. 8. Communication between the electronic unit and a mobile phone, a satellite navigation system, a computer, or a wireless communication station is provided via the wireless communication component 7. Audio signal processing, data flow control and data processing are performed by a digital signal processor 8. Conversion of a digital signal into an analog signal to be played by the earphones, amplification of the analog signal and volume control are performed by a codec or a sound component 9. A memory component 10 is used for storage of firmware, equipment profile settings, and user data. The operation of electronic components is assured by at least one power source 11 in the form of a galvanic element and/or an accumulator battery and/or at least one alternative power source like a fuel element, or a solar battery, or a Peltier generator embedded into the electronic unit and/or disposed in the rigid members. The electronic unit may include push buttons 12, 13 of control means. A near field communication (NFC) component 14 may be used for fast pairing and for data exchange between the wearable electronic communication device and a mobile device.

In a few embodiments, the electronic unit may include additional components like a controller 15 for processing signals of buttons of control means, and a USB connector 16 for data exchange and/or charging the battery. A connector 17 may be used for connecting earphones, external microphones, and additional buttons of control means.

In various embodiments of the wearable electronic communication device, the push buttons may be configured to trigger functions selected from the following:
switching the wearable electronic communication device on and off;
answering and ending a mobile communication call;
pausing and resuming audio play;
changing audio volume;
selecting audio track or program;
rewinding forward/backward;
activating and deactivating voice control.

Ergonomic advantage of this embodiment of the wearable electronic communication device is that the push buttons disposed in the described way relative to the user's body facilitate using the body field reachable by the user's hands, thus allowing the user to control the accessory with no pulling it from under the clothes by pressing buttons which are easily addressable by touch through standard clothes since the buttons are relatively undisplaceable and projected to substantially the same spot of the user's body, and they are tactually distinguishable from each other and able to provide a feedback in the form of a tactile or sound response (a click) upon pushing thereof.

The buttons are spaced from each other in order to avoid unintended pushing two push buttons simultaneously with one finger, wherein the buttons disposed on the electronic unit are duplicated, and the buttons disposed on the rigid members are disposed on separate plates/boards protected from unintended pushing by flush design thereof.

The function to be performed is triggered by pushing simultaneously two push buttons disposed astride a train/stub with two fingers, the thumb and the forefinger of one hand, simultaneously. This excludes unintended pushing by a seat belt in a car, a belt of a bag, etc. Such disposition of the buttons provides maximal accessibility thereof even when a necktie, a suit, or an outerwear is put on.

Figure 9:
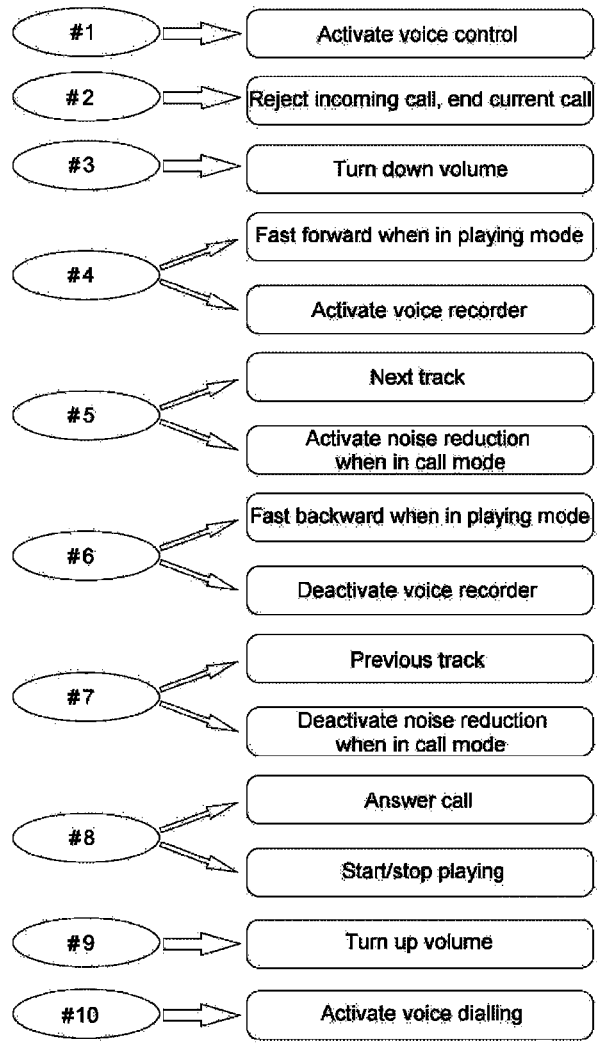
FIGS. 9 and 10 show implementation of button control function in an embodiment of the wearable electronic communication device according to the invention.
Figure 10:
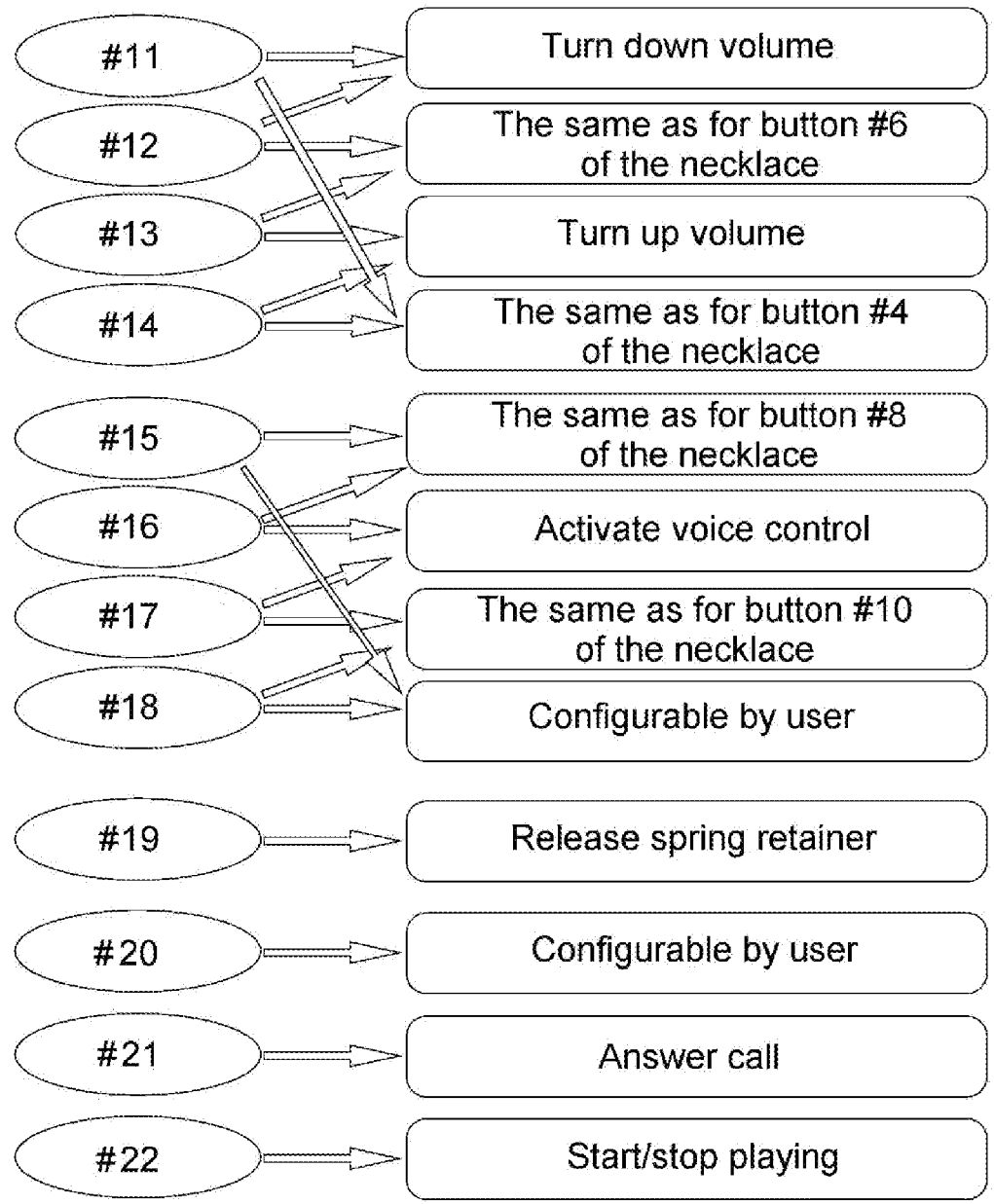

Possible allocation of the functions to the buttons is shown in FIG. 9 and FIG. 10. An electronic voice notification device may be used to alert the user of the changed settings.

Figure 11:
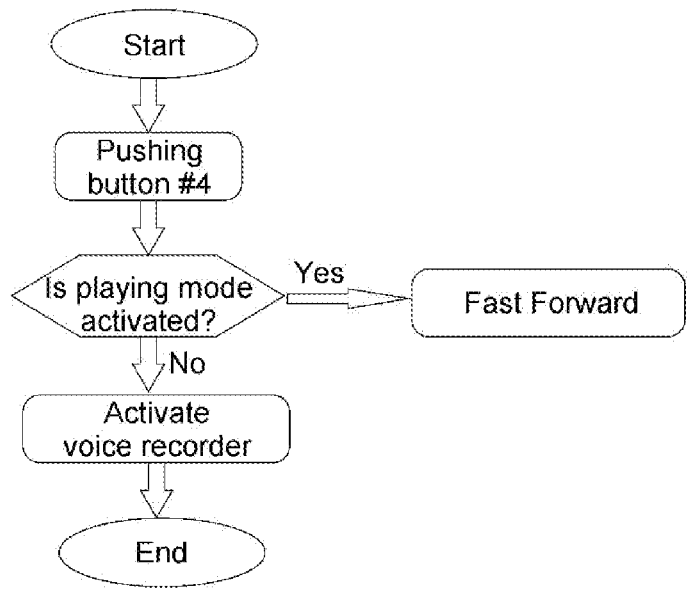
FIG. 11 shows exemplary flowcharts of algorithm procedures performed upon pushing buttons, according to the invention.
Figure 11:
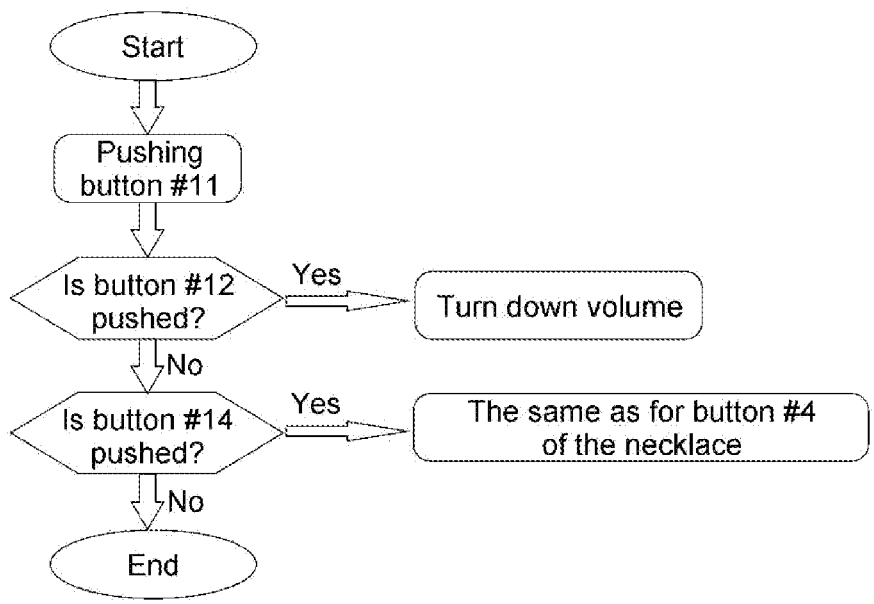

FIG. 11 shows examples of procedures performed upon pushing buttons. The arrows indicate the functions activated when the buttons are pushed. Division of a button into two portions means a twin button.

Figure 12:
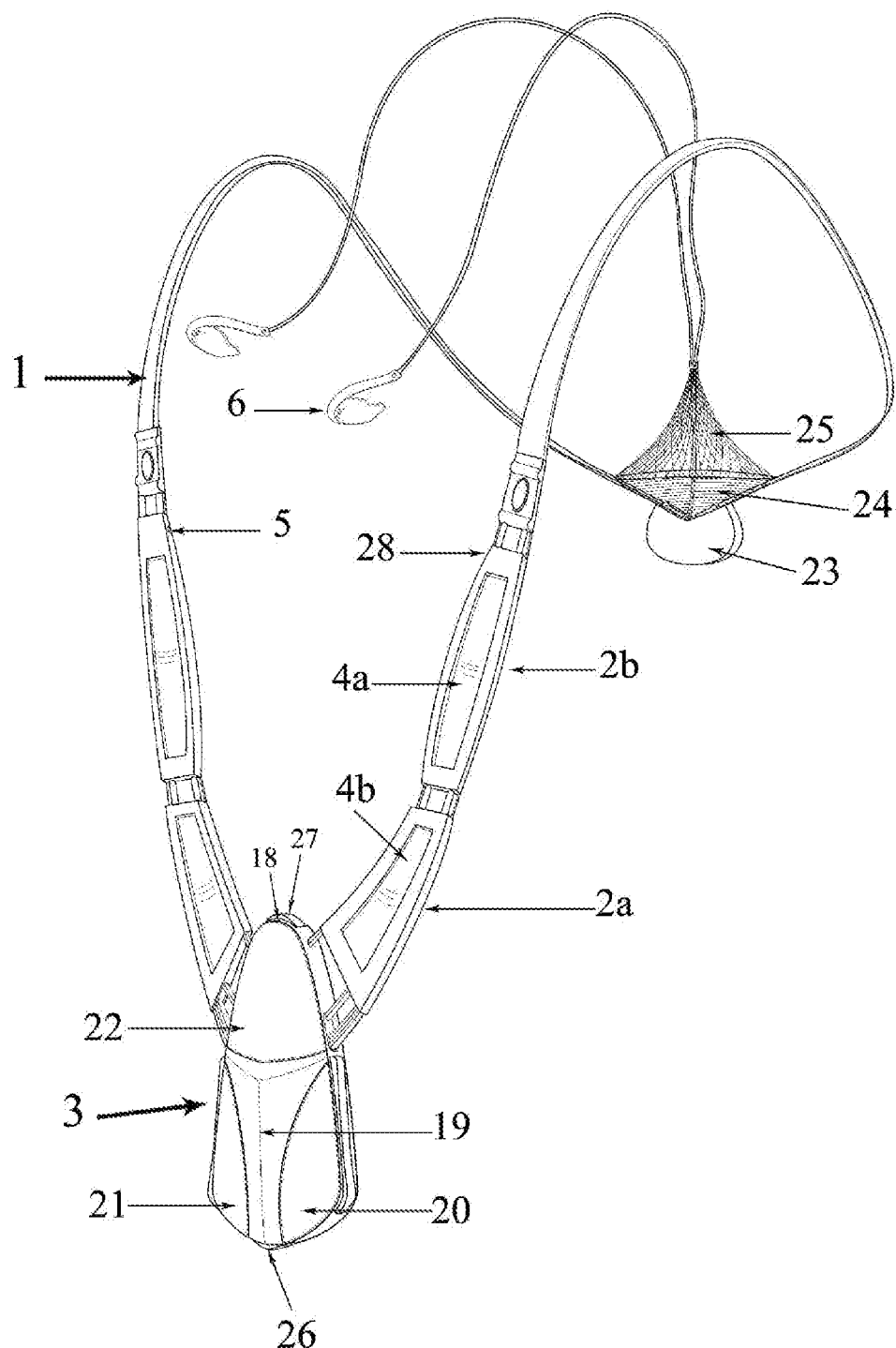
FIG. 12 shows a general view of an embodiment of the wearable electronic communication device according to the invention, indicating main functional elements.

In an embodiment of the wearable electronic communication device power source(s) and microphone(s) 5 may be disposed in the rigid members 2a, 2b (FIG. 12). The power sources like batteries may be distributed over different parts of the wearable device. Configuration of the wearable electronic communication device contemplates possibility of wearing it under the user's clothes thus excluding use of external microphone located close to the user's mouth. This requires forming a particular layout of the microphones and using a SW/HW solution for processing the signals acquired from the microphones. The configuration of the wearable device including a neck loop 1, rigid members 2a, 2b, an electronic unit 3, and wire joints allows disposing more microphones thereon, including laryngophones, and a high-speed digital signal processor which provides hardware and software support for operation of a noise reduction system and allows processing signals acquired from a sufficient number of microphones, cutting off unwanted sounds and (which is the most important thing) talking with no use of a microphone located near the user's mouth. The noise reduction system may be used not only for processing the outgoing signal, but also for suppressing external sounds in the earphones by forcing activation of this function in noisy places like subway, odeum, etc., and deactivation thereof when the user directly talks to people without pulling out the earphones from the ears.

The microphone 18 for detecting the user's speech may be located at the upper portion of the electronic unit 3; two to nine microphones forming a microphone grid may be used in more advanced embodiments. In some embodiments of the wearable electronic communication device the wires passing a signal to the earphone may be abandoned, so only one power wire may be kept, and a wireless communication component may be disposed in each earphone, which transmits and receives the earphone signal.

As one of the problem to be solved while providing the wearable electronic communication device was enabling wearing the device under clothes and managing it through the clothes by touch, while avoiding unintended pushes, the following design solutions were implemented (FIG. 12). The electronic unit 3 has a protection rib 19 for separating the buttons 20, 21, 22 triggering different functions. The neck loop 1 bears connecting/adjusting and feeding/winding mechanisms 23, a storage pocket 24 for storing wires and the earphones 6, a net spring 25 disposed on the outer surface of the upper portion of the user's back at the border of lower dorsal surface of the neck while wearing the device.

The buttons 26, 27 disposed on the electronic unit 3 upon simultaneous pressing thereof provide unlocking retainer of a reel or rollers contained in the winding mechanism 23 in this embodiment. Microphones 5, 28, batteries and push buttons are disposed in the rigid members 2. Electric connection diagram for buttons and microphones in one embodiment of the accessory is shown in FIGS. 13, 14, 15. Twelve buttons and seven microphones are used in this embodiment. Digital microphones are used as the microphones; typical pin layout thereof is shown in FIG. 13.

Data output pins, synchronization signal input pins of the buttons and microphones are connected to pins of a signal processor or controller 29 (FIG. 15). The earphones are connected to a control integrated circuit which is the codec 30 or to a sound component containing a digital-to-analog converter and an amplifier with externally controlled gain. The processor also exchanges data with peripheral devices 31 during its operation. FIG. 14 shows electric diagram of one of possible solutions for the wearable electronic communication device.

Figure 16:
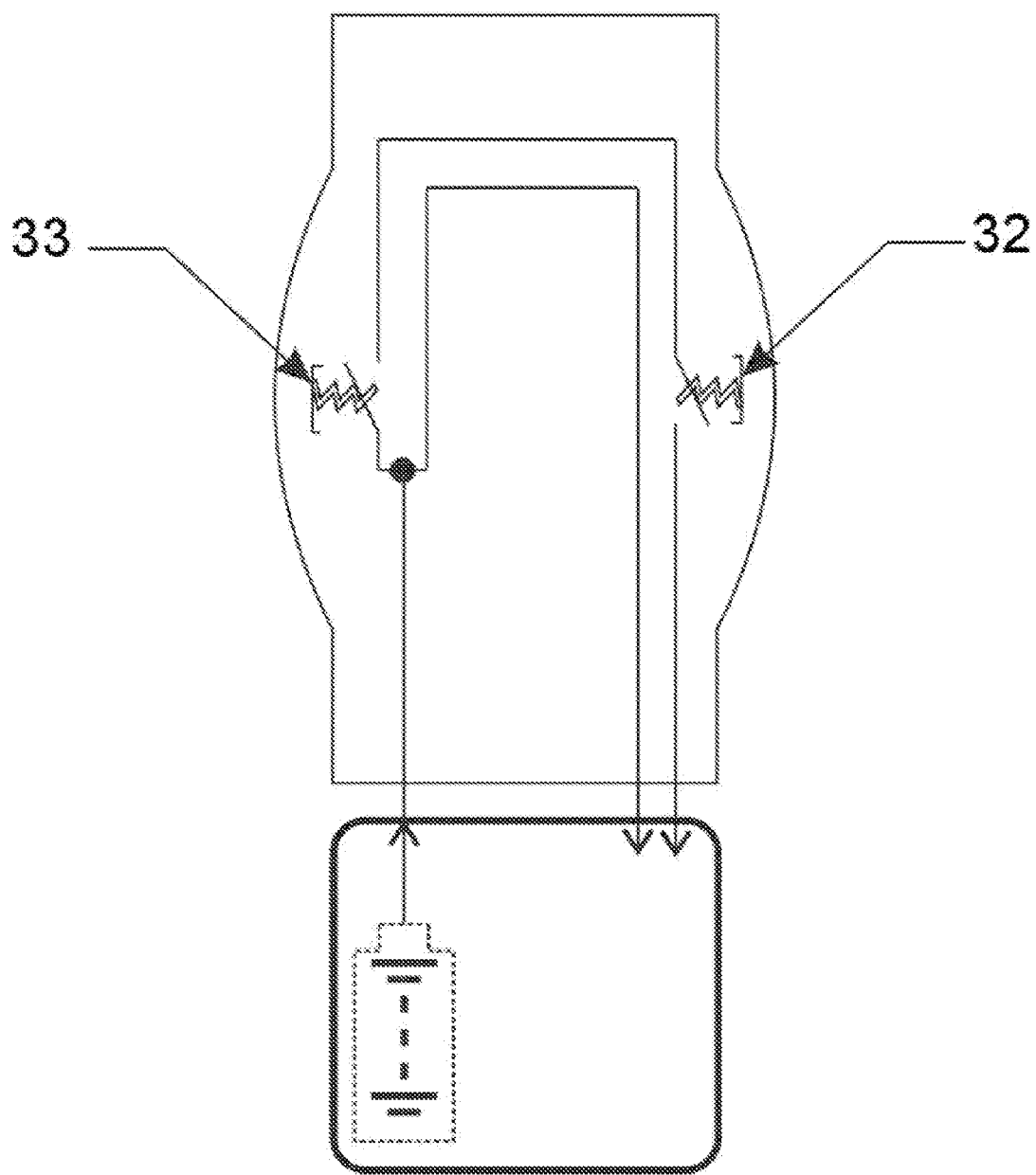
FIGS. 16, 17 and 18 show different schematic diagrams of button connections, according to the invention.
Figure 17:
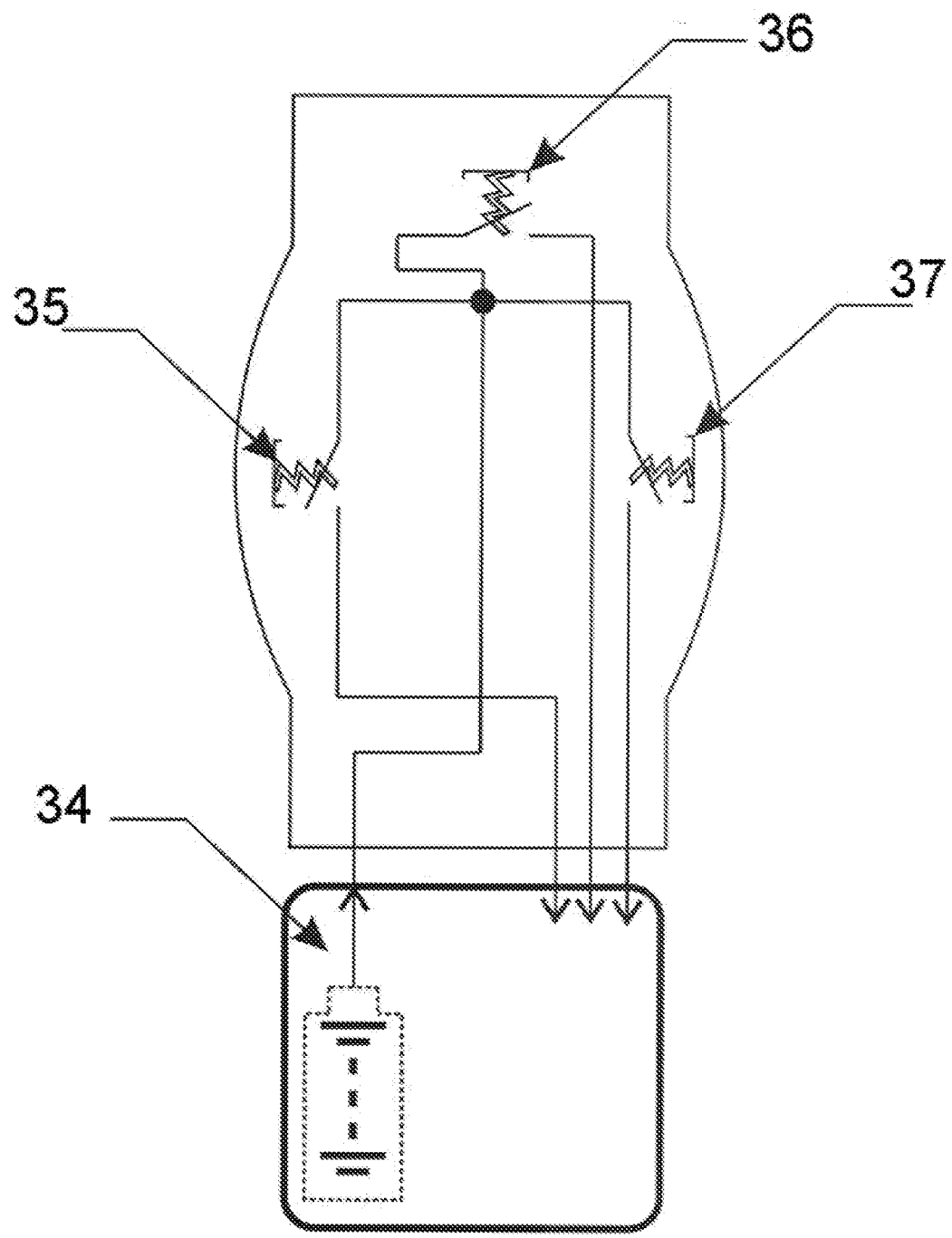
Figure 18:
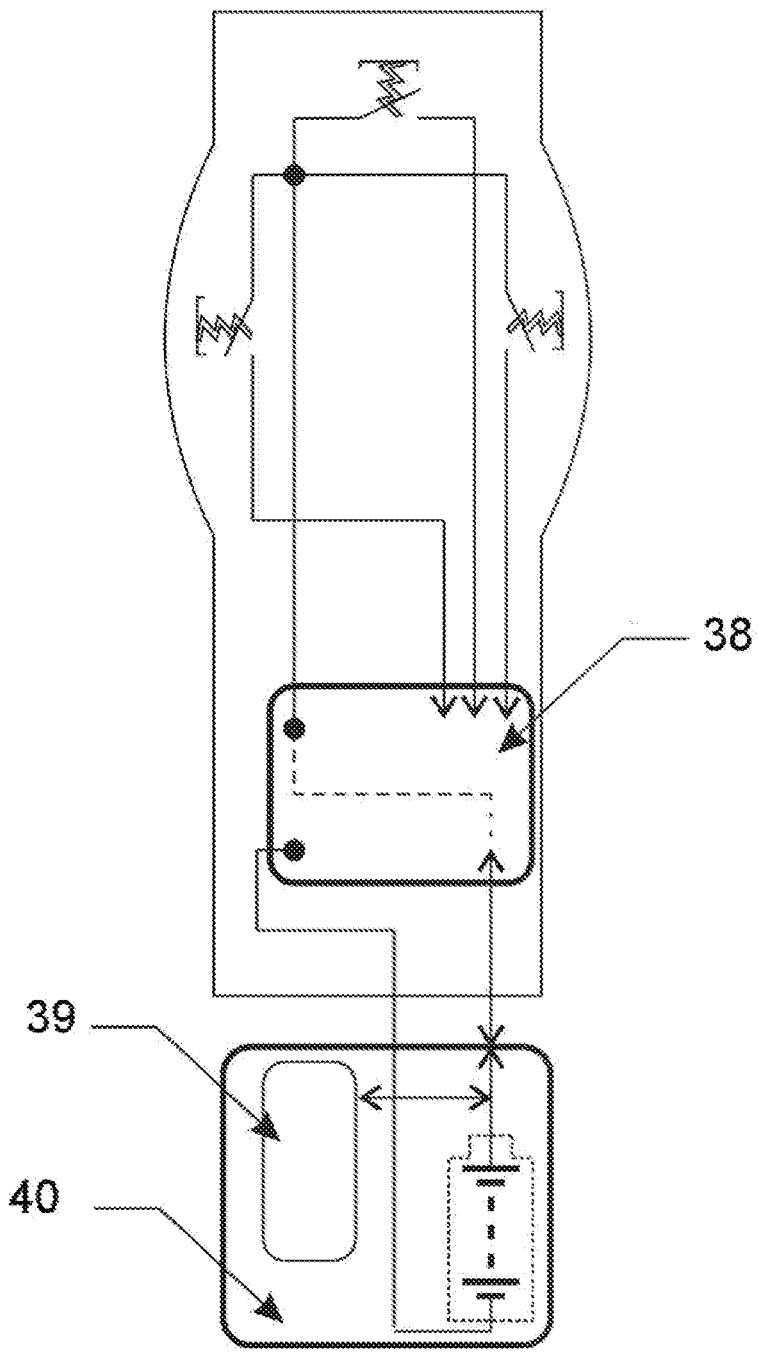

One of particularities of the wearable device is a control algorithm in which generation of a control instruction is performed upon pushing two buttons simultaneously. FIGS. 16 to 18 show electric diagrams for possible instructions generation embodiments.

In one embodiment, the push buttons 32, 33 are included in the circuit in series (FIG. 16).

In some embodiments, more than two buttons are used, and pushing any pair of the buttons triggers formation of a control signal; in this case a controller 34 may perform required preprocessing signals fed from the buttons (FIG. 17). An example of selecting instruction by the controller is provided in Table 1 which illustrates the selection of combinations among three buttons 35, 36, 37.

Table 1 contains instruction selection guide implemented by the controller upon pushing three buttons 35, 36, 37. In the table, "1" corresponds to pushed button causing occurrence of a signal in one of the controller inputs.

In addition to the main controller, an internal controller disposed close to the buttons may be used for supplying a preprocessed digital signal via serial port 38 in order to transmit a result of the button pushes to the main controller 39 for further processing (FIG. 18). Selection of a particular function is performed by sequential transmission of high frequency binary pulses directly via power wires connecting the electronic unit 40 and the button assembly. This allows reducing the number of wires connecting the rigid members to the electronic unit.

In some embodiments, the wearable electronic communication device may be controlled by voice instructions.

The constantly wearable under clothes but hardly noticeable electronic communication device allows the user to be online or stay connected, listen to the music or podcasts, receive actual voice information without having wires being tangled or caught, and thus the user would not have deteriorated appearance and would not stand out against the people around.

Figure 19:
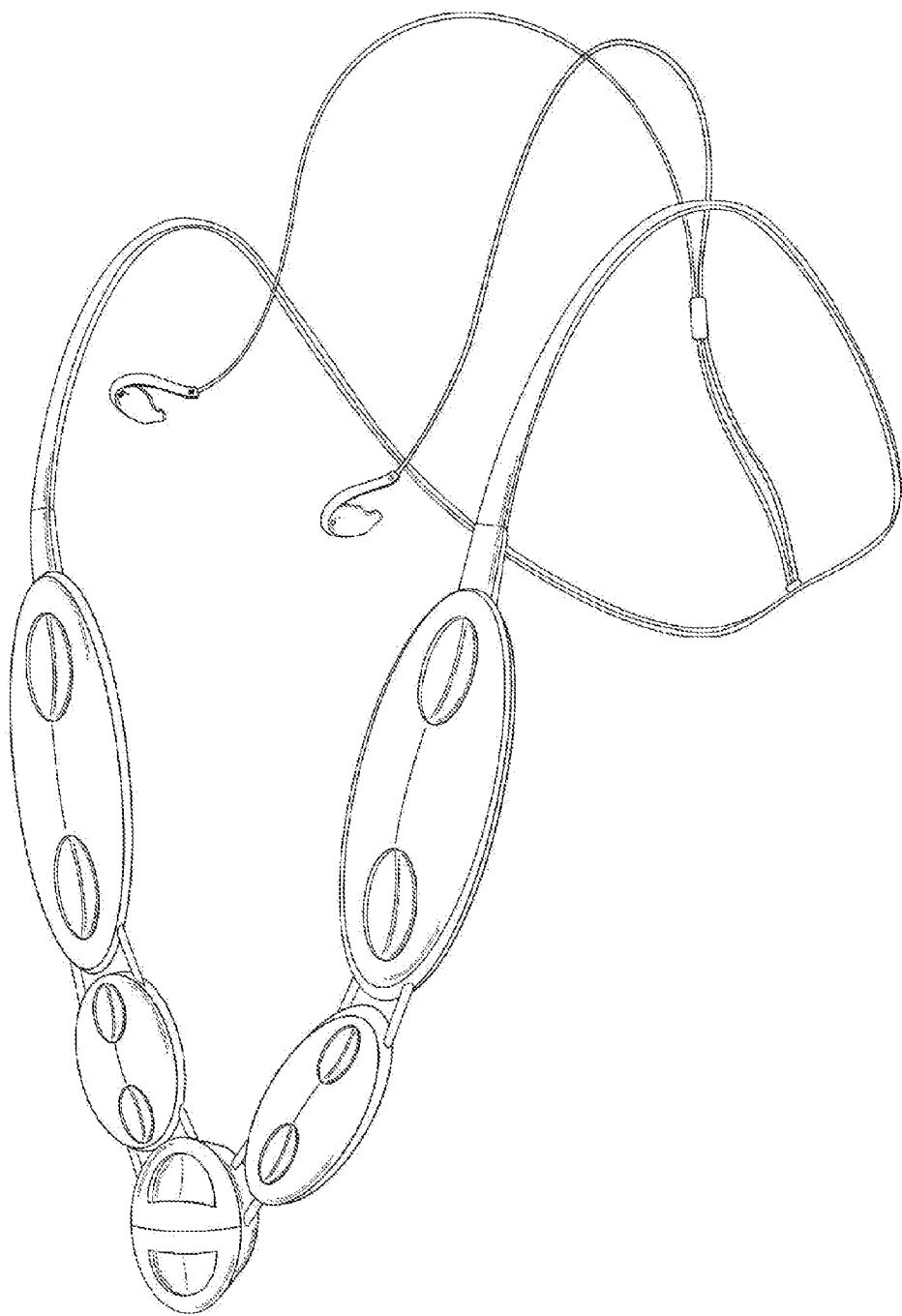
FIGS. 19, 20 show general views of different embodiments of the wearable electronic communication device according to the invention.
Figure 20:
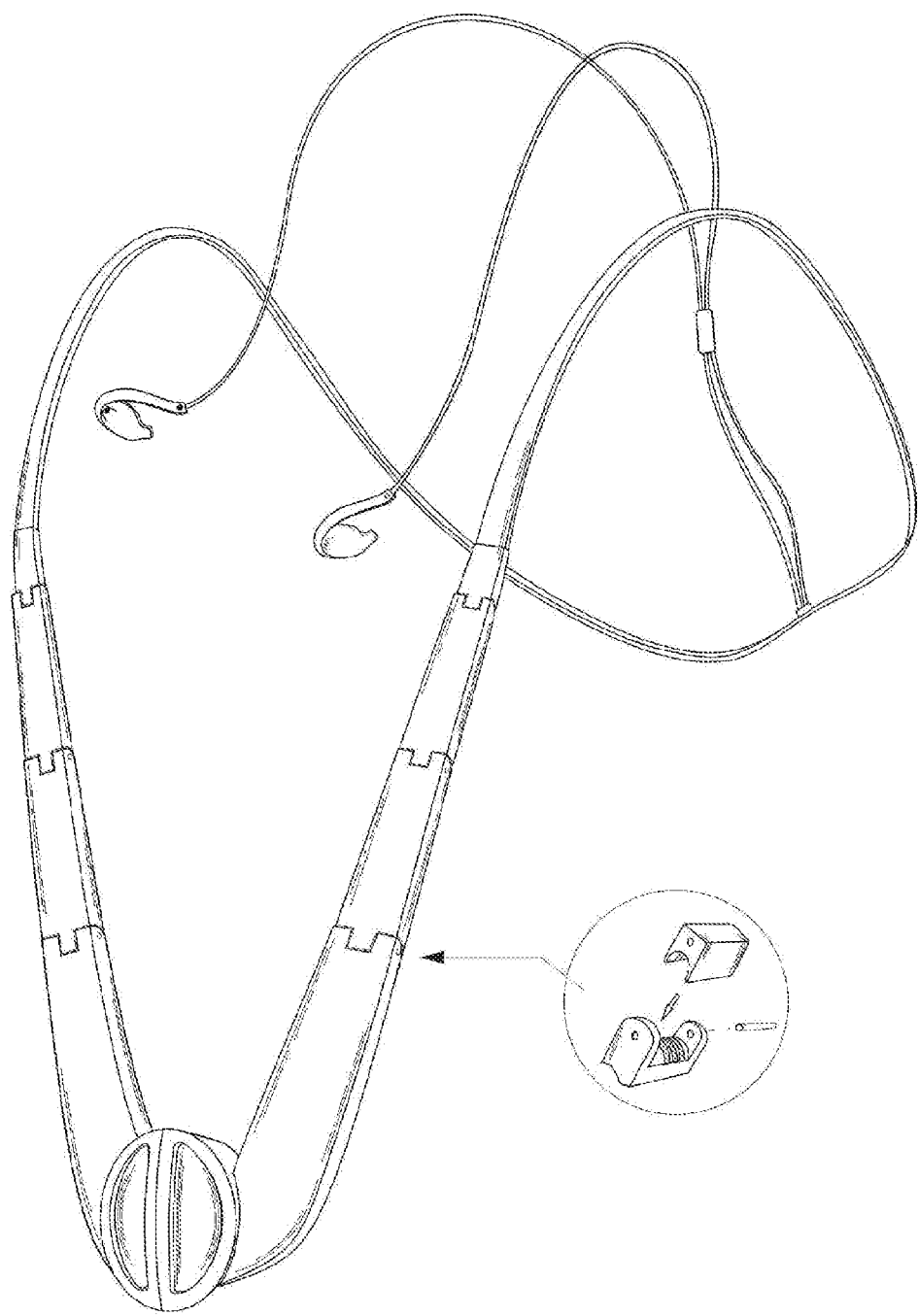

The wearable electronic communication device may be combined with a bijouterie or jewelry article (FIG. 19, FIG. 20).

Direct contact between the wearable device and human skin allows placing sensors for monitoring the user's state of health like sensors of temperature, blood pressure, glucose and alcohol content in the skin discharges, etc., which allow monitoring galvanic skin response in order to watch over operation of the sympathetic nervous system, thus using the wearable electronic communication device as a part of a biotelemetry system for medical diagnosis.

The wearable electronic communication device may be used as a part of a wearable mobile system, wherein the equipment base is distributed over several wearable devices, e.g. some portion of equipment and power base may be located in a trouser belt, and a wire connection with the wearable electronic communication device may be provided by a wire located under clothes on the human back along the vertebral column. The wearable electronic communication device itself may be a mobile phone or a smart phone, and a separately wearable display/keyboard device may serve as a wireless interface thereof.

The advantages of the wearable electronic communication device will be even more obvious as the technology of voice communication between a human and a computer is further developed and high-speed mobile Internet access becomes widely available, the advantages including talking and listening to a connected party using HD-voice technology and stereo mode; GPS navigation without visual tracking a map but merely with sound instructions received by the user via earphones; emerging new voice services in the Internet and Internet surfing without a display and mouse but with using just a voice interface. Thus owing to the wearable electronic communication device, the user may stay connected or online during any actions, functions, or operations requiring use of both hands of the user, never being distracted by holding a telephone but instead using voice prompts of an operator or a computer.

In any embodiment the wearable electronic communication device may be used for control purpose.

TABLE 1

Selection of instructions by the controller upon processing strokes of three buttons.

| Button Designator | | | |
|---|---|---|---|
| 35 | 36 | 37 | Instruction |
| 0 | 0 | 0 | No instruction |
| 1 | 0 | 0 | No instruction |
| 0 | 1 | 0 | No instruction |
| 0 | 0 | 1 | No instruction |
| 1 | 0 | 1 | Instruction 1 |
| 1 | 1 | 0 | Instruction 2 |
| 0 | 1 | 1 | Instruction 3 |
| 1 | 1 | 1 | No instruction |

The invention claimed is:

1. A wearable electronic communication device comprising
   a flexible loop being at least partly flattened and comprising at least two rigid members connected to each other so as to impede twisting the rigid members relative to each other;
   at least one electronic unit;
   control means comprising at least two push buttons electrically connected to the electronic unit and disposed on the rigid members at such a distance from each other so as to avoid possibility of pushing two push buttons simultaneously with one finger, wherein the push surface of each push button does not project beyond the surface of the rigid member bearing the push button, and a control signal is generated when two of the push buttons are pushed simultaneously.

2. The wearable electronic communication device of claim 1, wherein the electronic unit is disposed in one of the rigid members.

3. The wearable electronic communication device of claim 1, wherein at least one of the rigid members further comprises a power source.

4. The wearable electronic communication device of claim 1, wherein the flexible loop is open.

5. The wearable electronic communication device of claim 1, wherein while wearing thereof by the user, the push surface of the push button is disposed substantially in parallel with the front surface of the user's chest.

6. The wearable electronic communication device of claim 1, wherein the push surface of the push button occupies a major portion of the rigid member surface.

7. The wearable electronic communication device of claim 1, wherein at least one of the rigid members further comprises a microphone.

8. The wearable electronic communication device of claim 1, wherein the control means comprise more than two push buttons and control signals are generated when two push buttons are pushed simultaneously, by selection of various combinations among the three or more push buttons.

9. The wearable electronic communication device of claim 1 further comprising at least one earphone electrically connected to the electronic unit.

10. The wearable electronic communication device of claim 9, wherein the control means are configured to generate acoustic signals transmitted to the earphone upon pushing the push buttons.

11. The wearable electronic communication device of claim 1, wherein the push buttons are provided in the form of keys with mechanically driven contacts.

12. The wearable electronic communication device of claim 1, wherein the push buttons are provided in the form of piezoelectric transducers.

13. The wearable electronic communication device of claim 1, wherein the electronic unit further comprises at least one wireless communication transceiver.

14. The wearable electronic communication device of claim 1, wherein the electronic unit further comprises an audio recording and/or playing device.

15. The wearable electronic communication device of claim 1, wherein at least one function triggered by the push buttons are configured by the user.

16. The wearable electronic communication device of claim 1 wherein while wearing thereof by the user, the push buttons are disposed within an area in the form of an isosceles triangle having the base connecting proximal ends of clavicle and the vertex directed downwards to xiphisternum of the user.

* * * * *